UNITED STATES PATENT OFFICE.

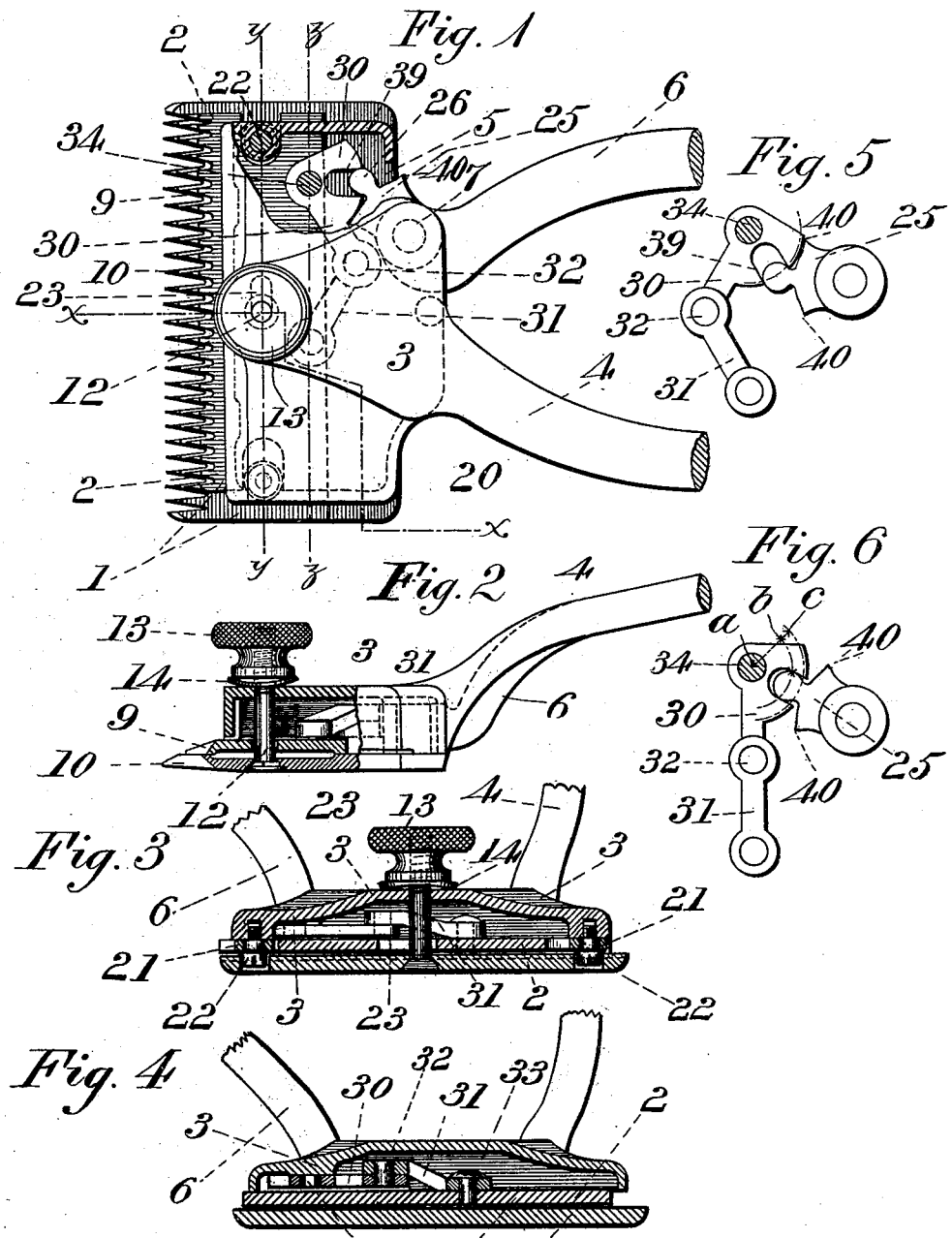

EDWARD A. COCHRAN, OF BROOKLYN, NEW YORK.

SHEARING-CLIPPERS.

SPECIFICATION forming part of Letters Patent No. 508,164, dated November 7, 1893.

Application filed January 11, 1893. Serial No. 458,013. (No model.)

*To all whom it may concern:*

Be it known that I, EDWARD A. COCHRAN, a citizen of the United States, residing at Brooklyn, in the county of Kings and State of New York, have invented certain new and useful Improvements in Shearing-Clippers, of which the following is a specification.

This invention is applicable to animal shears, or human hair clippers, and said invention relates to the class in clippers wherein the cutter-plate is reciprocated from the extremity of its stroke in one direction to the extremity of its stroke in the other direction, and back again, by each single motion of the movable handle, as described in my separate patent application, filed October 10, 1892, Serial No. 448,309; the object of thus doubly reciprocating the cutter-plate at each stroke of the movable handle being to multiply the cutting capacity of the tool without requiring any more rapid or increased range of movement of the hands in operating the clipper than heretofore.

My present invention consists in certain improvements relating to the transmission of motion from the movable handle of the tool, to a toggle-joint reciprocating mechanism, whereby the aforesaid double motions of the cutter plate are obtained to best advantage; and, in order to enable others skilled in the art to which my invention appertains to understand and use the same, I will proceed to describe the details of its construction, explain its operation and point out in the appended claims its novel characteristics.

Referring to the accompanying drawings: Figure 1, is a plan view of the clipper with the housing partly removed to show the interior mechanism; Fig. 2, a side elevation taken partly in section on the line *x—x*, Fig. 1; Fig. 3, a transverse section, taken on the line *y—y*, Fig. 1; Fig. 4, a transverse section of Fig. 1, taken on the line *z—z;* and Figs. 5 and 6, are detail views illustrating different positions of the toggle-joint mechanism shown in Fig. 1.

The housing 3, is made integral with the stationary handle 4, and an opening 5, is provided at the back of the housing, for the reception of the movable handle 6, which is pivoted at 7, upon the stud depending from said housing. The cutter plate is reciprocated to and fro to such an extent that its teeth 9, pass two interspaces of the teeth 10, upon the comb-plate 1, at each reciprocation, and the teeth 9, 10, are kept in shearing contact by means of the spring washer 14, interposed between the housing and the clamping nut 13, screw-threaded to the stud 12, projected from the comb-plate.

The cutter-plate 2, is provided with slots 20, whereby it is guided on the anti-friction rollers 21, mounted on the screws 22, that are suitably shouldered to receive said rollers, and screw-threaded into the housing 3, as appears in Fig. 3.

A suitable slot 23, is provided in the cutter-plate 2, to allow of its free passage past the stud 12, said slot being indicated by dotted lines in Fig. 1.

The movable handle 6, is provided with a segment 25, bearing at its extremity a round tooth 26.

The toggle bars 30, 31, are pivoted together at their adjoining ends at 32, and the bar 30, is pivoted to the housing 3, at its outer end, at 34, as seen in Figs. 1 and 4, while the outer bar 31, is pivoted at its outer end at 33, to the cutter-plate 2, as also seen in Fig. 4. The toggle bar 30, is provided with a concentric segment 38, containing a radial slot 39, adapted to receive the round head 26, of the segment of the movable handle 6.

When the movable handle 6, is moved to its position nearest the stationary handle 4, as illustrated in Fig. 1, the toggle bars 30, 31, occupy one extreme angular position, so that the cutter-plate is moved to the extremity of its stroke in one direction, and when the movable handle 6, is moved to an intermediate position, the toggle bars 30, 31, are in a straight line, as in Fig. 6, bringing the cutter-plate 2, to the other extremity of its stroke, and when the movable handle 6, has continued its motion to that position farthest from the stationary handle 4, the toggle bars 30, 31 occupy the opposite extreme angle, as in Fig. 5, returning the cutter-plate 2, to its first position, corresponding to that in Fig. 1. Two motions of the cutter-plate are thereby performed by one motion of the handle 6. When the handle 6, is returned from its outer position to its inner position, the double motion of the cutter-plate 2, is repeated in a similar manner, thus causing the shearing operations to be multiplied without increasing the rapidity or range of movement given to the handles of the implement.

As will be observed in Figs. 1 and 5, shoulders 40, are formed on the segment 25, designed to abut on the segment 38, at extreme positions of the handle 6, and limit the movement of the mechanism.

The advantageous feature of the herein-described device consists in that the transmitting contact between the head of the segment 25, and the slot of the segment 38, occurs at the longest radius (a—c, Fig. 6) on the said segment 38, as in Figs. 1 and 5, affording greatest leverage when the toggle-joint 30, 31, is at an extreme angle or nearly so, adapted to give rapid motion to the cutter-plate and requiring the greatest power to move it. When at an intermediate position, as in Fig. 6, the head of the segment 25, operates on the slot of the segment 38, at a comparatively short radius of the latter (a—b, Fig. 6) with less leverage when the toggle bars 30, 31 are in a straight line or nearly so, requiring less power to move them to operate the cutter, and rapid motion in order to quickly reverse the cutter and avoid loss of time between the operations of cutting.

The present invention may be applied to an implement having its operating handles suitably formed to be grasped by one hand of the operator, and the outward motions of the movable handle 6, may be affected by means of a suitable spring applied thereto, in the manner usual to hair clippers.

Having thus fully described my invention, what I claim, and desire to secure by Letters Patent, is—

1. In animal shears, the combination of a suitable shearing device, comprising a comb-plate, a movable cutter-plate thereon, means for limiting the thrust of the cutter plate, means for holding the tool, a movable handle pivoted to the frame of the tool, toggle bars pivotally jointed together at their adjacent ends, the opposite end of one said bar pivoted to the cutter-plate, the opposite end of the other said bar pivoted to the frame of the implement, and upon the toggle bar thus pivoted to the frame of the implement a radially slotted segment concentric with its fixed pivot, and upon the said movable handle a segment bearing a projection adapted to play in the slot of said segment of the toggle bar and to transmit motion at variable radii therein substantially as and for the purpose set forth.

2. The combination in animal shears, with the comb plate, the reciprocating cutter-plate, and the toggle joint mechanism such as described, of a radially slotted segment upon one member of the toggle, a movable handle pivoted to the frame of the tool, having a segment bearing a round projection adapted to play in the slot of said segment of the toggle bar, and shoulders upon one of said segments adapted to abut on the other of said segments and limit the movement of the mechanism.

In testimony whereof I have hereunto set my hand this 9th day of January, 1893.

EDWARD A. COCHRAN.

Witnesses:
H. F. PARKER,
HENRY KLEIN.